(12) United States Patent
Ogino

(10) Patent No.: US 12,243,129 B2
(45) Date of Patent: Mar. 4, 2025

(54) ELECTROPHORETIC ANALYSIS DATA PROCESSING DEVICE AND ELECTROPHORETIC ANALYSIS DATA PROCESSING PROGRAM

(71) Applicant: SHIMADZU CORPORATION, Kyoto (JP)

(72) Inventor: Kota Ogino, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 143 days.

(21) Appl. No.: 18/095,167

(22) Filed: Jan. 10, 2023

(65) Prior Publication Data

US 2023/0306663 A1   Sep. 28, 2023

(30) Foreign Application Priority Data

Mar. 24, 2022   (JP) ................. 2022-048477

(51) Int. Cl.
*G06T 11/20* (2006.01)
*G01N 27/447* (2006.01)
*G06T 11/00* (2006.01)

(52) U.S. Cl.
CPC ...... *G06T 11/206* (2013.01); *G01N 27/44704* (2013.01); *G06T 11/001* (2013.01); *G06T 2200/24* (2013.01); *G06T 2210/62* (2013.01)

(58) Field of Classification Search
CPC . G06T 11/206; G06T 11/001; G06T 2200/24; G06T 2210/62; G01N 27/44704; G01N 27/447
See application file for complete search history.

(56) References Cited

U.S. PATENT DOCUMENTS 7,373,263 B2 * 5/2008 Cohn ................. G01R 31/3177
702/119
10,761,054 B2 * 9/2020 DeSimas .......... G01N 27/44717
(Continued)

FOREIGN PATENT DOCUMENTS

JP           2020-20725 A      2/2020

OTHER PUBLICATIONS

Shimadzu Corporation, "Application News No. B65, MultiNA Ni Yoru Hetero Nihonsa Idoudo Bunseki (HMA: Heteroduplex Mobility Assay) (Application News No. B65, Heteroduplex Mobility Assay by MultiNA)", Sep. 2017, first edition.

*Primary Examiner* — Motilewa Good-Johnson
(74) *Attorney, Agent, or Firm* — Sughrue Mion, PLLC (57) ABSTRACT

Provided is a data processing device for processing data acquired by an electrophoretic analysis. A graph creator (31, 33) creates an electropherogram and/or a separation image of peaks on an electrophoretic channel. A display processor (37) displays a graph showing the electropherogram and/or the separation image on which a boundary line is drawn to define the inside and the outside of an analysis target range extending along an axis of a separation direction, with the inside and the outside being shown in different visual modes. An analysis condition setter (34) receives an operation by a user for moving the boundary line on the graph displayed and sets the analysis target range whose position and size on the axis are changed according to the received operation. A data-analysis processor (35, 36) carries out a predetermined computation using all or some of peaks included in the analysis target range.

10 Claims, 8 Drawing Sheets

(56) References Cited

U.S. PATENT DOCUMENTS

| | | | |
|---|---|---|---|
| 11,379,974 B2* | 7/2022 | Kumagai | G01N 27/44756 |
| 11,791,015 B2* | 10/2023 | Ogino | G16B 40/10 |
| | | | 702/19 |
| 2005/0115837 A1* | 6/2005 | Burgi | G01N 27/4473 |
| | | | 204/603 |
| 2016/0333397 A1* | 11/2016 | Matsunaga | C12Q 1/6816 |
| 2020/0043162 A1* | 2/2020 | Kumagai | G01N 27/44756 |
| 2020/0211672 A1* | 7/2020 | Ogino | G16B 40/10 |
| 2023/0034939 A1* | 2/2023 | Asai | A61B 5/245 |
| 2023/0306663 A1* | 9/2023 | Ogino | G01N 27/447 |

* cited by examiner

Molar Concentration Ratio Analysis ☒

Name of Analysis Condition

| No.3 |
|---|

☐ Analysis Range ☐ Entire Range

| | Lower Limit (bp) | Upper Limit (bp) | |
|---|---|---|---|
| | 0 | 632 | |

▓ Exclusion Range

| | Lower Limit (bp) | Upper Limit (bp) | |
|---|---|---|---|
| 1 | 3 | 14 | |
| 2 | | | |
| 3 | | | |

▽ Focused-on Fragment

| | Size (bp) | -(bp) | +(bp) | |
|---|---|---|---|---|
| A | 145 | 3 | 21 | |
| B | 190 | 23 | 0 | |
| C | | | | |

| Import | Export |
|---|---|

( Save ) ( Cancel )

ELECTROPHORETIC ANALYSIS DATA PROCESSING DEVICE AND ELECTROPHORETIC ANALYSIS DATA PROCESSING PROGRAM

TECHNICAL FIELD

The present invention relates to a data processing device for processing data acquired by an electrophoretic device, and a computer program for the data processing on that device.

BACKGROUND ART

In drug discovery, medical treatment, agriculture and livestock, biochemistry and other related areas, a set of data collected by an electrophoretic device may be used as a basis for determining the abundance ratio (e.g., concentration ratio, molar concentration ratio, or mass concentration ratio) of a specific kind of molecule (e.g., a nucleic acid or protein) among a large number of types of molecules contained in a sample, so as to use the abundance ratio for an analysis of the sample.

For example, Non Patent Literature 1 discloses the technique of easily determining the mutation rate of each individual in genome editing by comparing the molar concentration of the heteroduplex and that of the homoduplex, using the function of calculating a molar concentration from an electropherogram.

CITATION LIST

Patent Literature

Patent Literature 1: JP 2020-20725 A

Non Patent Literature

Non Patent Literature 1: "Application News No. B65, MultiNA Ni Yoru Hetero Nihonsa Idoudo Bunseki (HMA: Heteroduplex Mobility Assay) (Application News No. B65, Heteroduplex Mobility Assay by MultiNA)", Shimadzu Corporation, first edition issued in September 2017

SUMMARY OF INVENTION

Technical Problem

As described in Non Patent Literature 1, the molar concentration is calculated from the areas of the peaks in an electropherogram. Patent Literature 1 discloses an electrophoretic separation data analyzing device having the function of calculating and displaying an abundance ratio based on the area values of the peaks located within an analysis target range specified by a user in an electropherogram and that of a peak located within a focused-on range similarly specified by the user.

This type of data analyzing device requires a user, or an operator, to specify the analysis target range and the focused-on range. These ranges can be numerically specified. It is also possible to specify the analysis target range and the focused-on range on an electropherogram, as well as on a separation image of the peaks on the electrophoretic channel (a virtual gel image).

In the data analyzing device described in Patent Literature 1, a user interface (UI) control for specifying a desired analysis target range (or the like) on a graph, such as an electropherogram or separation image, is provided. However, this UI control still has problems. For example, it is not easy for the operator to intuitively recognize what range the operator themselves has specified. It is also difficult to understand the relationship between the analysis target range and the focused-on range.

The present invention has been developed to solve these problems. Its primary objective is to provide an electrophoretic analysis data processing device and an electrophoretic analysis data processing program which can even further improve the ease of operation in an analysis of data collected by an electrophoretic analysis, thereby improving the working efficiency of the data analysis as well as reducing errors in the task.

Solution to Problem

One mode of the electrophoretic analysis data processing device according to the present invention developed for solving the previously described problems is a data processing device for processing data acquired by an electrophoretic analysis, including:
- a graph creator configured to create an electropherogram and/or a separation image of peaks on an electrophoretic channel, based on acquired data;
- a display processor configured to display, on a display section, a graph showing the electropherogram and/or the separation image on which a boundary line is drawn to define the inside and the outside of an analysis target range extending along the axis of a separation direction, with the inside and the outside being shown in different visual modes;
- an analysis condition setter configured to receive an operation by a user for moving the boundary line on the graph displayed, and to set the analysis target range whose position and size on the axis are changed according to the received operation; and
- a data-analysis processor configured to carry out a predetermined computation using all or some of the peaks included in the analysis target range.

One mode of the electrophoretic analysis data processing program according to the present invention developed for solving the previously described problems is a data processing program for using a computer to process data acquired by an electrophoretic analysis, the program configured to cause a computer to perform:
- a graph creation step for creating an electropherogram and/or a separation image of peaks on an electrophoretic channel, based on acquired data;
- a display processing step for displaying, on a display section, a graph showing the electropherogram and/or the separation image on which a boundary line is drawn to define the inside and the outside of an analysis target range extending along the axis of a separation direction, with the inside and the outside being shown in different visual modes;
- an analysis condition setting step for receiving an operation by a user for moving the boundary line on the graph displayed, and for setting the analysis target range whose position and size on the axis are changed according to the received operation; and
- a data-analyzing step configured to carry out a predetermined computation using all or some of the peaks included in the analysis target range.

Advantageous Effects of Invention

In the previously described modes of the electrophoretic analysis data processing device and the electrophoretic analysis data processing program according to the present invention, an analysis target range for calculating the molar concentration (or the like) of a target component can be specified by a simple, intuitively understandable operation on an electropherogram or separation image. In particular, since the inside and the outside of the analysis target range can be clearly distinguished from each other by their difference in the display mode, such as the color of the area on the electropherogram or separation image, the operator can efficiently and correctly understand whether or not a peak which the operator's attention is focused on is certainly included within the analysis target range, or conversely, whether or not a peak originating from a non-target component is certainly excluded from the analysis target range.

Thus, the previously described modes of the electrophoretic analysis data processing device and the electrophoretic analysis data processing program according to the present invention can improve the ease of operation for a molar concentration ratio analysis or other various kinds of analyses which use data collected by an electrophoretic analysis. The working efficiency of the data analysis is thereby improved, and user's errors in the task are reduced.

DESCRIPTION OF EMBODIMENTS

One embodiment of an electrophoretic analyzer system employing an electrophoretic analysis data processing device and an electrophoretic analysis data processing program according to the present invention is hereinafter described referring to the attached drawings.

Figure 1:
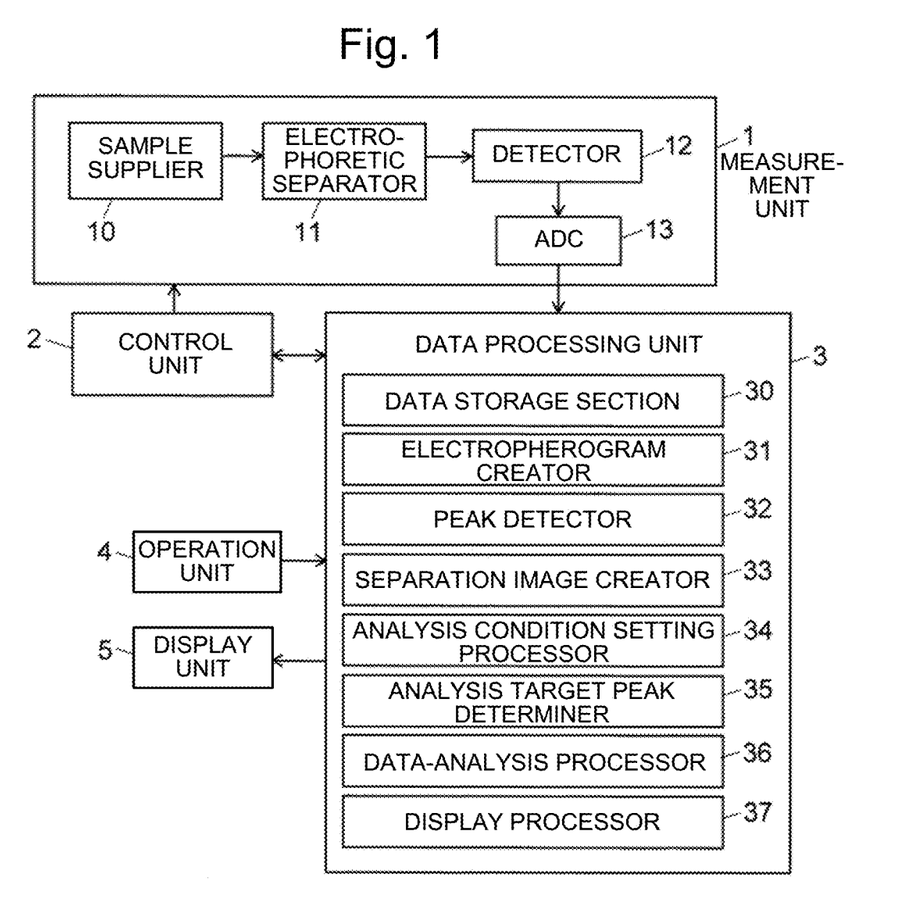
FIG. 1 is a schematic configuration diagram of an electrophoretic analyzer system according to one embodiment of the present invention.

FIG. 1 is a schematic configuration diagram of the electrophoretic analyzer system according to the present embodiment.

As shown in FIG. 1, the present system includes a measurement unit 1, control unit 2, data processing unit 3, operation unit 4 and display unit 5.

The measurement unit 1 is a device for performing an electrophoretic analysis on each of the plurality of given samples to acquire data for each sample. It includes a sample supplier 10, electrophoretic separator 11, detector 12, analog-to-digital converter (ADC) 13 and other components. For example, a microchip electrophoresis system for DNA/RNA analysis "MultiNA", manufactured by Shimadzu Corporation, can be used as the measurement unit 1.

The data processing unit 3 has the function of processing the data acquired in the measurement unit 1, and includes, as its functional blocks, a data storage section 30, electropherogram creator 31, peak detector 32, separation image creator 33, analysis condition setting processor 34, analysis target peak determiner 35, data-analysis processor 36, display processor 37 and other components.

Generally speaking, the control unit 2 and the data processing unit 3 can be constructed using, as a hardware resource, a personal computer (PC) including a CPU, memory and other components, with at least some of their functions realized by executing, on the PC, dedicated process-and-control software (computer program) previously installed on the same PC. In that case, the operation unit 4 includes the keyboard and a mouse (or similar pointing device) provided for the PC, while the display unit 5 is a display monitor provided for the PC.

The computer program can be offered to users in the form of a non-transitory computer-readable record medium holding the program, such as a CD-ROM, DVD-ROM, memory card, or USB memory (dongle). The program may also be offered to users in the form of data transferred through the Internet or similar communication networks. The program can also be preinstalled on a computer (or more exactly, on a storage device as a component of a computer) as a part of a system before a user purchases the system.

For example, when the electrophoretic analyzer system according to the present embodiment is used to perform a DNA analysis, a well plate containing a large number of samples each of which contains DNA fragments to be analyzed, and predetermined reagents (including the buffer solution), are set in the sample supplier 10. An operator using the operation unit 4 sets the analyzing schedule and issues a command to initiate the measurement. Then, the control unit 2 begins to operate the measurement unit 1 to carry out the analysis according the previously determined program.

Specifically, in the electrophoretic separator 11, the channel in the electrophoresis chip is filled with the buffer solution. Subsequently, a sample contained in a predetermined well on the well plate set in the sample supplier 10 is injected into a predetermined portion of the channel in the electrophoresis chip. Then, a predetermined electrophoresis voltage is applied to each of the plurality of reservoirs in the chip so as to cause the sample to migrate along the separation channel, whereby the components (DNA fragments) in the sample are separated from each other along the direction of the channel. The detector 12, which is a fluorescent detector, sequentially detects the electrophoretically separated components. The detection signals produced by the detector 12 are digitized by the analogue-to-digital converter 13. The resulting data are sent to the data processing unit 3 and saved in the data storage section 30.

When a set of data collected by performing the previously described measurement for one or more samples is present in the data storage section 30, a molar concentration ratio analysis is performed in the data processing unit 3. One example of the procedure of this analysis is hereinafter described.

Figure 2:
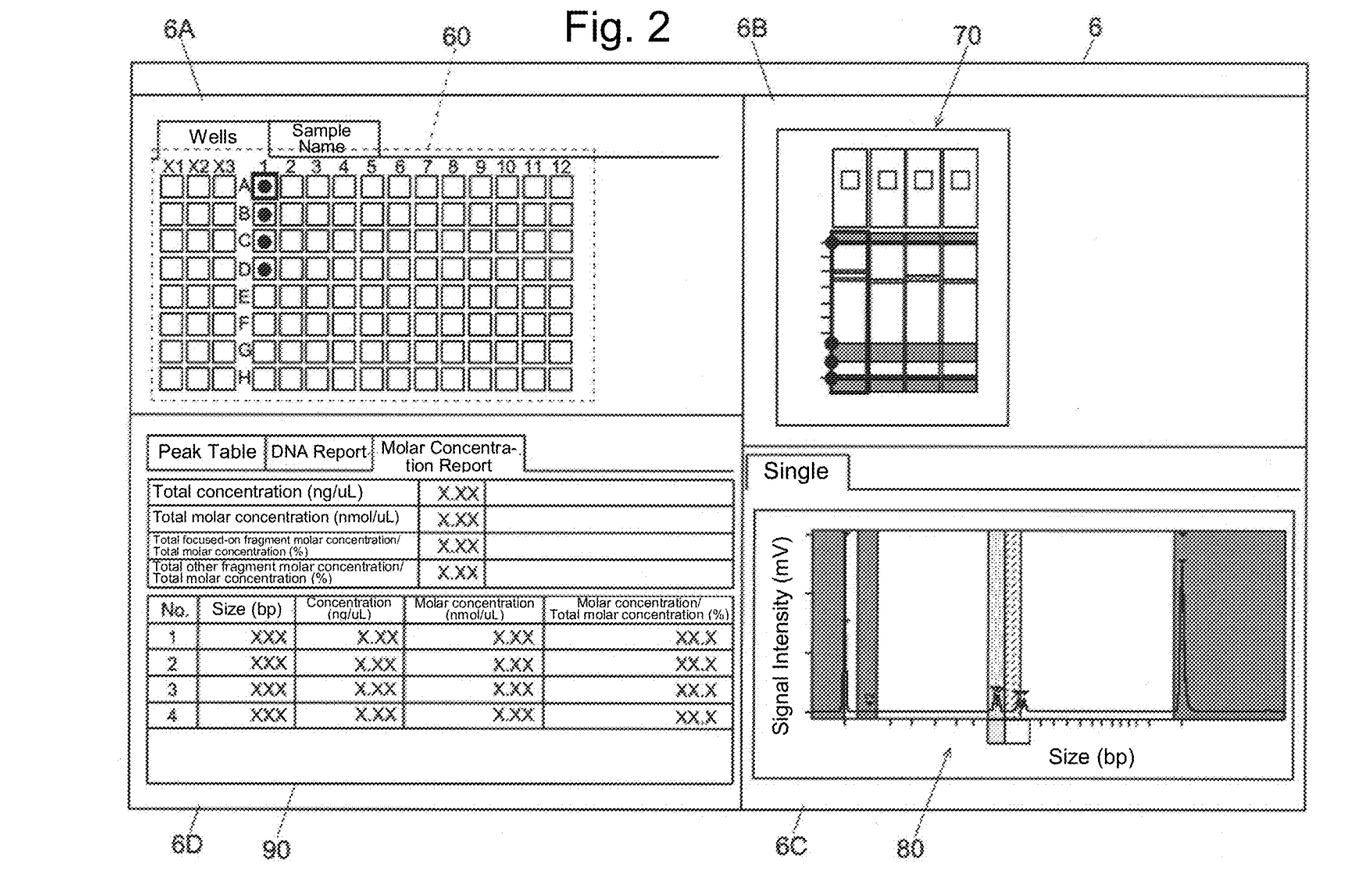
FIG. 2 is a schematic diagram showing one example of a molar concentration ratio analysis screen in the electrophoretic analyzer system according to the present embodiment.

The operator performs a predetermined operation using the operation unit 4. Then, the display processor 37 displays, on the screen of the display unit 5, a molar concentration ratio analysis screen 6 shown in FIG. 2 as one example. The molar concentration ratio analysis screen 6 is roughly divided into four areas: sample display area 6A, separation image display area 6B, electropherogram display area 6C and analysis result display area 6D. It should be noted that FIG. 2 shows the state after a molar concentration ratio analysis has been performed, or the state in which the result of the previously performed molar concentration ratio analysis is displayed. When no molar concentration ratio analysis has been performed before, nothing is shown in the separation image display area 6B and the electropherogram display area 6C, while a table in which the analysis-result fields are blanked is shown in the analysis result display area 6D.

In the sample display area 6A, a well image 60, which is a mock view of a well plate, is displayed. On this image, the operator designates one or more samples as the targets of the molar concentration ratio analysis by a click operation using the operation unit 4. In the example of FIG. 2, the samples contained in the four wells having well numbers of A1, B1, C1 and D1, indicated by the dots, are designated as the targets of the molar concentration ratio analysis.

After designating one or more samples on the well image 60, the operator issues a command to initiate the analysis. Then, the electropherogram creator 31 retrieves, from the data storage section 30, the data files corresponding to the designated samples and creates an electropherogram based on the data saved in each file.

After the electropherogram has been created, the peak detector 32 detects a peak in each electropherogram according to a predetermined algorithm and collects peak information, such as a peak-top position, peak-beginning position, peak-ending position, peak-top intensity and peak area. The peak information thus collected will be used for the calculation of the molar concentration ratio, total peak area value and other quantities, as will be described later.

The separation image creator 33 creates a separation image of the peaks on the migration channel (the so-called "gel image") based on the created electropherograms and the information related to the detected peaks.

The horizontal axis of the electropherogram and the axis of the separation image correspond to the axis of the direction of the electrophoretic separation. In the present case, this axis indicates "migration time", "travel time index" or "size", from which the operator can select one. The "migration time" axis directly indicates the time values recorded when the measurement was performed in the measurement unit 1. The "travel time index" axis indicates migration times in a normalized form (in %) based on the migration times of a plurality of reference substances of known sizes added to the sample. The "size" axis shows substantial size values converted from migration times based on the known sizes of a plurality of reference substances.

The display processor 37 displays the created electropherogram and the separation image in the electropherogram display area 6C and the separation image display area 6B of the molar concentration ratio analysis screen 6, respectively. FIG. 2 shows the state in which four separation images 70 which respectively correspond to the four samples selected on the well image 60 are displayed, along with one electropherogram 80 corresponding to one sample selected from the four samples by the operator. The selected sample is indicated in the well image 60 by highlighting the rectangular area corresponding to one well by a thick frame having a display color different from the other frames, or in the separation images 70 by highlighting the separation image corresponding to the selected sample by a thick frame having a display color different from the other frames. It should be noted that FIG. 2 shows the state of the electropherogram 80 and the separation images 70 after the analysis target range and other related ranges for the calculation of the molar concentration ratio have already been specified. When the analysis target range and other related ranges have not yet been specified, the electropherogram 80a shown in FIG. 3 and the separation images 70a shown in FIG. 5 will be displayed.

Figure 3:
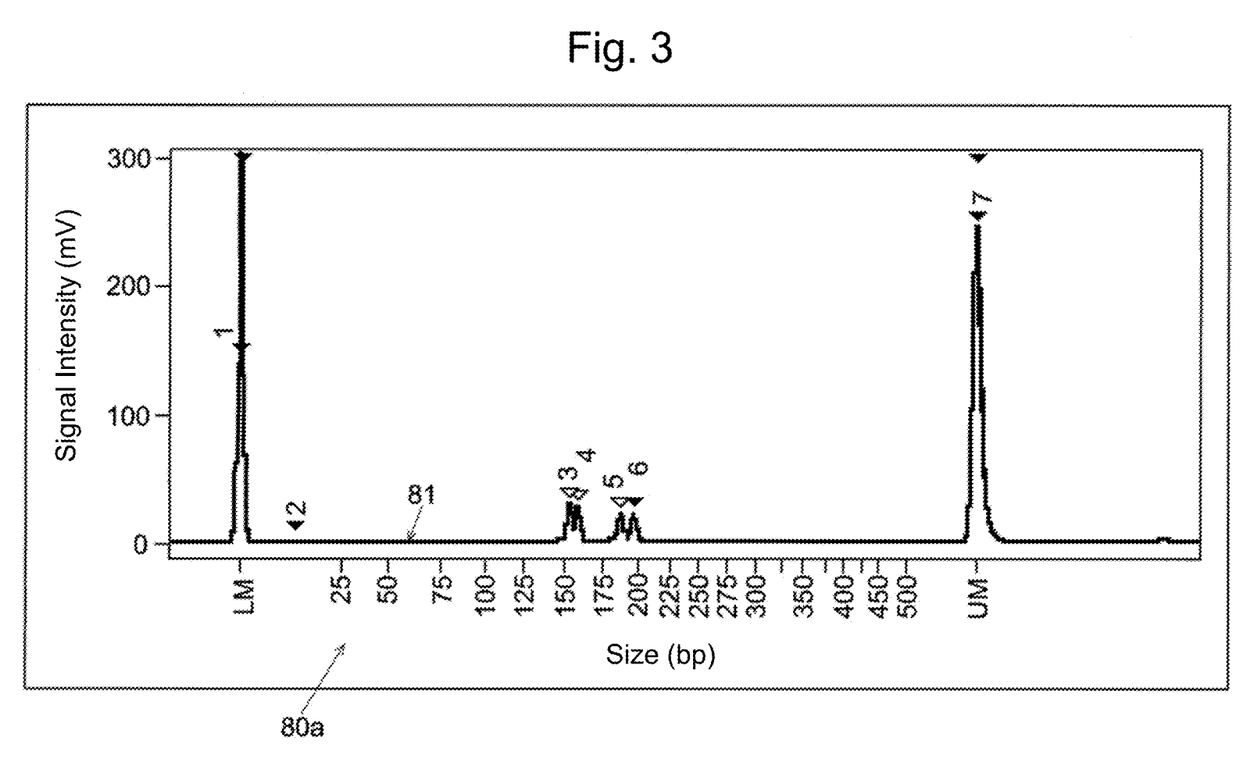
FIG. 3 is a diagram showing one example of the display of an electropherogram in the molar concentration ratio analysis screen (with the analysis target range and other kinds of ranges not specified yet).

The example of electropherogram 80a shown in FIG. 3 is an example in which one migration waveform 81 obtained for a single sample is drawn. The horizontal axis represents size. In FIG. 3, the peak observed at a position (size) corresponding to size "LM" (peak number 1) is a peak corresponding to a substance having a travel time index of 0%. The peak observed at a position corresponding to size "UM" (peak number 7) is a peak corresponding to a substance having a travel time index of 100%. The numerical values shown along the horizontal axis within the range from LM to UM are the sizes of a plurality of reference substances whose sizes are known.

Figure 5:
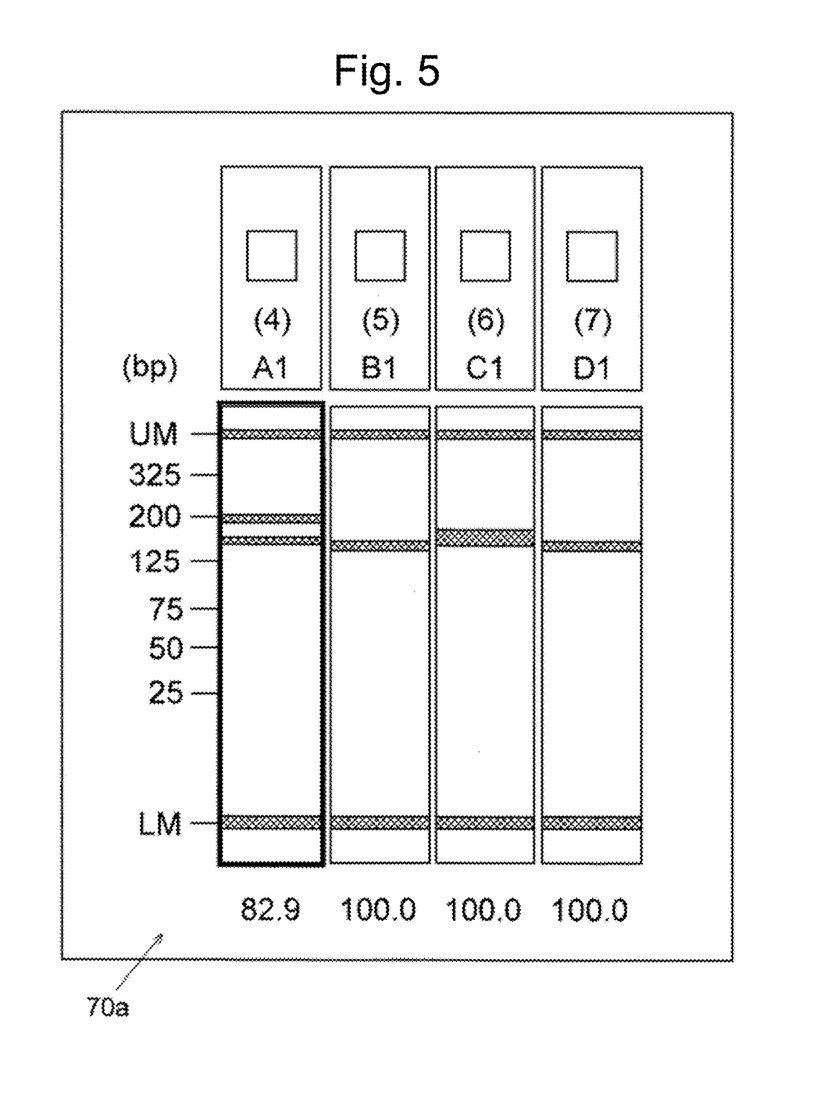
FIG. 5 is a diagram showing one example of the display of a separation image in the molar concentration ratio analysis screen (with the analysis target range and other kinds of ranges not specified yet).

The example of separation image 70a shown in FIG. 5 is an example in which vertically elongated separation images obtained for the four samples as described earlier are horizontally arranged. Its axis represents size. The scale along the axis in FIG. 5 corresponds to the scale in the electropherogram 80a. As is commonly known, a segment with a higher signal intensity in the electropherogram is shown in a darker color (closer to black) in the separation image.

Figure 7:
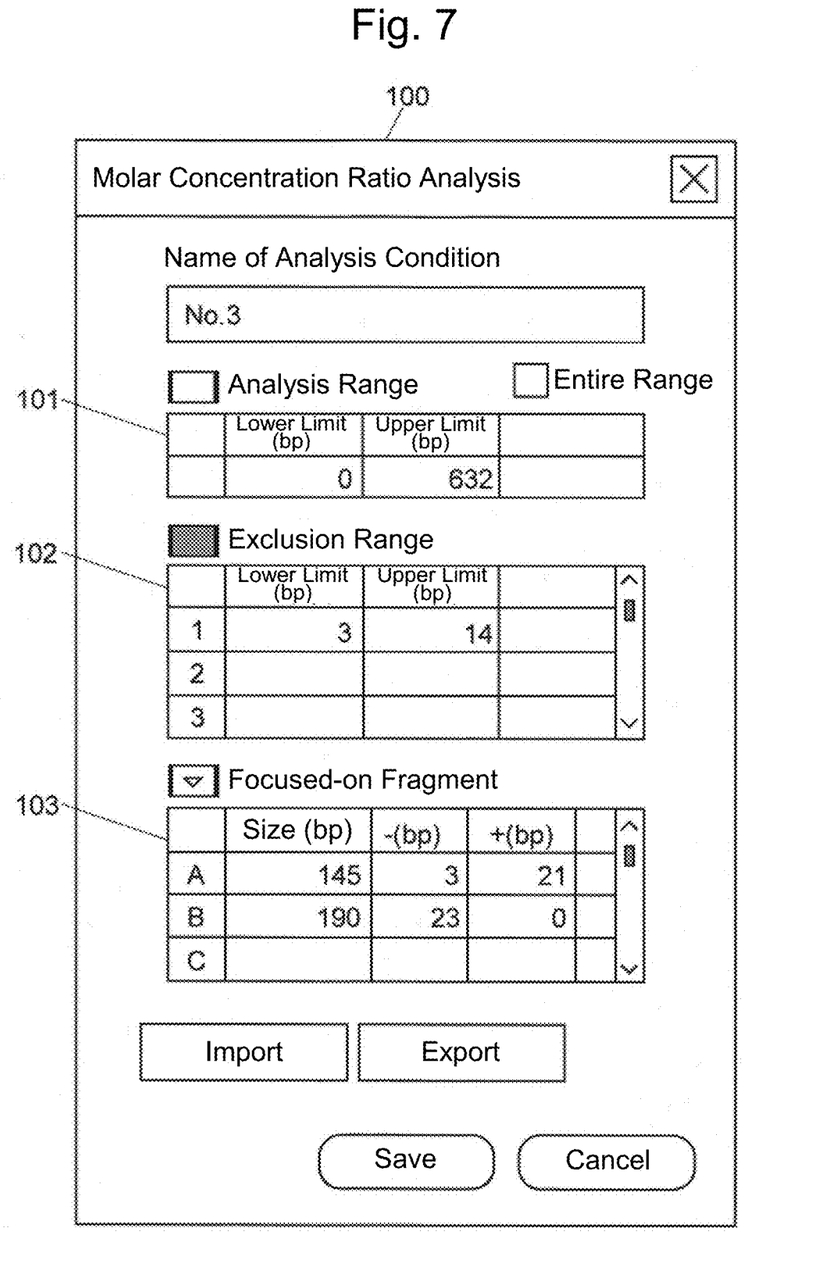
FIG. 7 is a diagram showing one example of an analysis condition setting dialog in a molar concentration ratio analysis.

When a predetermined operation on the molar concentration ratio analysis screen 6 is performed by the operator, the analysis condition setting processor 34 pops up an analysis condition setting dialog 100 shown in FIG. 7 as one example. This analysis condition setting dialog 100 can be moved to any position on the molar concentration ratio analysis screen 6 according to a drag-and-drop operation by the operator.

The analysis condition setting dialog 100 has three data grids: analysis range designation data grid 101, exclusion range designation data grid 102 and focused-on fragment designation data grid 103.

The analysis range designation data grid 101 is used for designating one range as the analysis range by specifying the upper and lower limits on the horizontal axis (in the present case, "size") of the electropherogram. If the "Entire Range" box is checked, the entire range is designated as the analysis range.

The exclusion range designation data grid 102 is used for designating, as an exclusion range, a range to be excluded from the analysis range in the data analysis, by specifying the upper and lower limits on the horizontal axis of the electropherogram. Two or more exclusion ranges can be designated in this data grid. The analysis range exclusive of the exclusion ranges is called the "analysis target range" in the present description.

The focused-on fragment designation data grid 103 is used for designating, as a "focused-on range", a range to be focused on within the analysis target range. One focused-on range can be specified by one numerical value as well as margins on the upper and lower sides of that value. The focused-on range can also be multiply designated.

By entering desired numerical values in the three data grids 101, 102 and 103, the operator can specify the analysis target range (i.e., the analysis range exclusive of the exclusion ranges) and the focused-on ranges within the analysis target range. However, it is troublesome to numerically specify appropriate values. To solve this problem, the present system allows the operator to set the analysis target range and the focused-on ranges as follows.

The operator enters appropriate numerical values in each of the three data grids 101, 102 and 103. When numerical values have been entered in any of the data grids 101, 102 and 103, the analysis condition setting processor 34 updates the electropherogram and the separation images displayed at the moment so as to reflect the information indicating the range corresponding to the entered numerical values.

Specifically, in the example shown in FIG. 7, there are one exclusion range and two focused-on ranges. Therefore, as shown in FIG. 4, the analysis condition setting processor 34 draws the following lines on the electropherogram 80b via the display processor 37: two analysis range indication lines 82 corresponding to the upper and lower limits specified in the analysis range designation data grid 101, two exclusion range indication lines 83 corresponding to one pair of upper and lower limits specified in the exclusion range designation data grid 102, and four focused-on range indication lines 84 corresponding to the two pairs of numerical values specified in the focused-on fragment designation data grid 103 (it should be noted that two of the four lines in FIG. 4 substantially coincide with each other).

Figure 4:
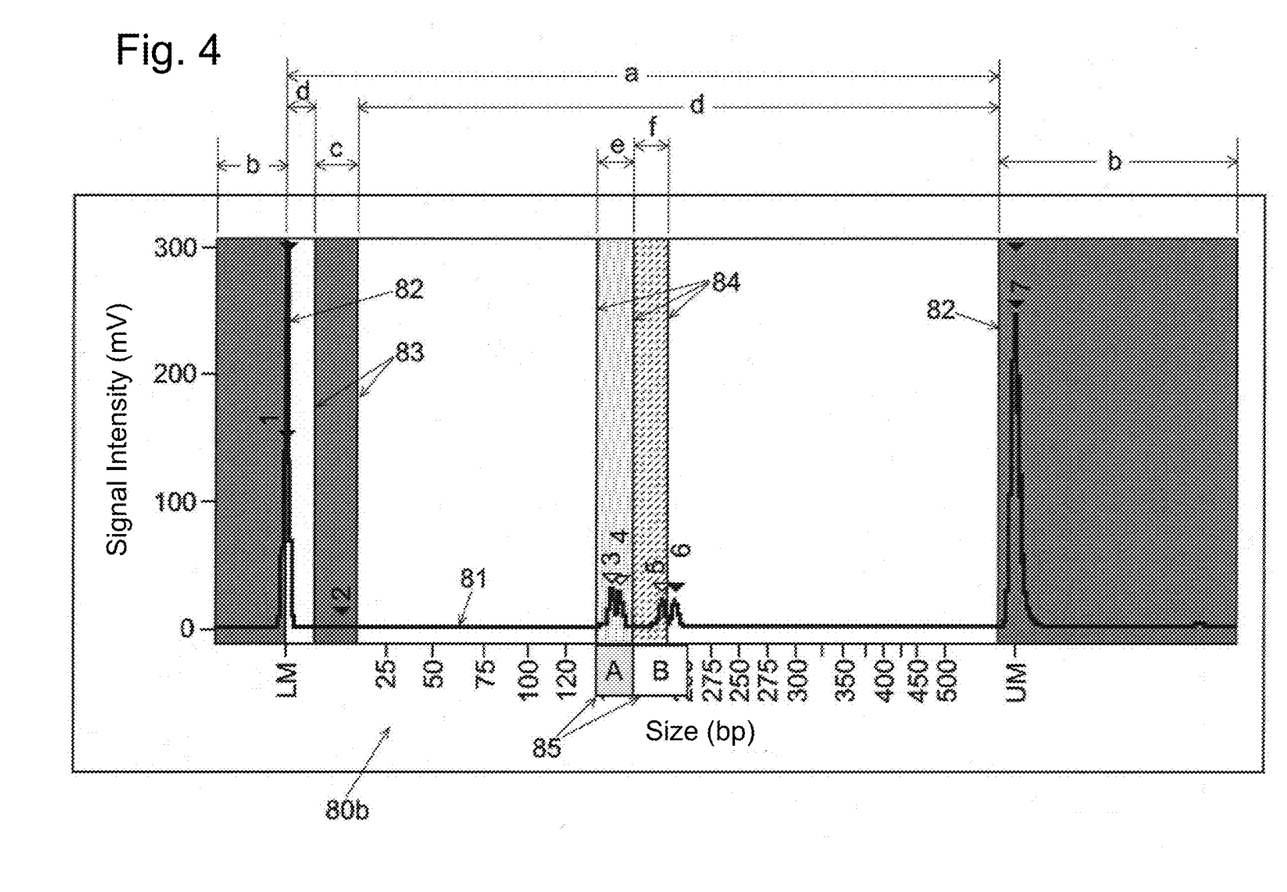
FIG. 4 is a diagram showing one example of the display of an electropherogram in the molar concentration ratio analysis screen (with the analysis target range and other kinds of ranges specified).

In FIG. 4, the ranges "b" between each analysis range indication line 82 and the right and left ends of the electropherogram 80b are on the outside of the analysis range as well as on the outside of the analysis target range (the ranges "b" are hereinafter called the "out-of-analysis range areas b"). The range "a" between the two analysis range indication lines 82 is the analysis range, within which the range "c" between the two exclusion range indication lines 83 is the exclusion range. Accordingly, the range to be practically subjected to the data analysis is the analysis target ranges "d", i.e., the analysis range "a" exclusive of the exclusion range "c". Within the analysis target ranges "d", each of the two ranges "e" and "f" which are respectively sandwiched between the two pairs of focused-on range indication lines 84 is a focused-on range.

The analysis condition setting processor 34 shows, via the display processor 37, the out-of-analysis range areas "b" and the exclusion range "c", i.e., the areas on the outside of the analysis target ranges "d", by an overlay display with an identical background color (e.g., dark blue). It also shows each of the two focused-on ranges "e" and "f" by an overlay display with their respective predetermined background colors (e.g., red and green) which are different from each other as well as different from the color of the analysis target ranges "d". The "overlay display" is a mode of display through which the migration waveform 81 lying underneath is visible. The portions of the analysis target ranges "d" other than the focused-on ranges "e" and "f" have no overlay display and have the original background color of the electropherogram 80b, which is typically white or a color close to white.

Thus, on the electropherogram 80b, the analysis target ranges "d" can be clearly distinguished from the other ranges (out-of-analysis range areas "b" and exclusion range "c") by sight. The positions of the focused-on ranges "e" and "f" within the analysis target ranges "d" can also be clearly recognized.

Figure 6:
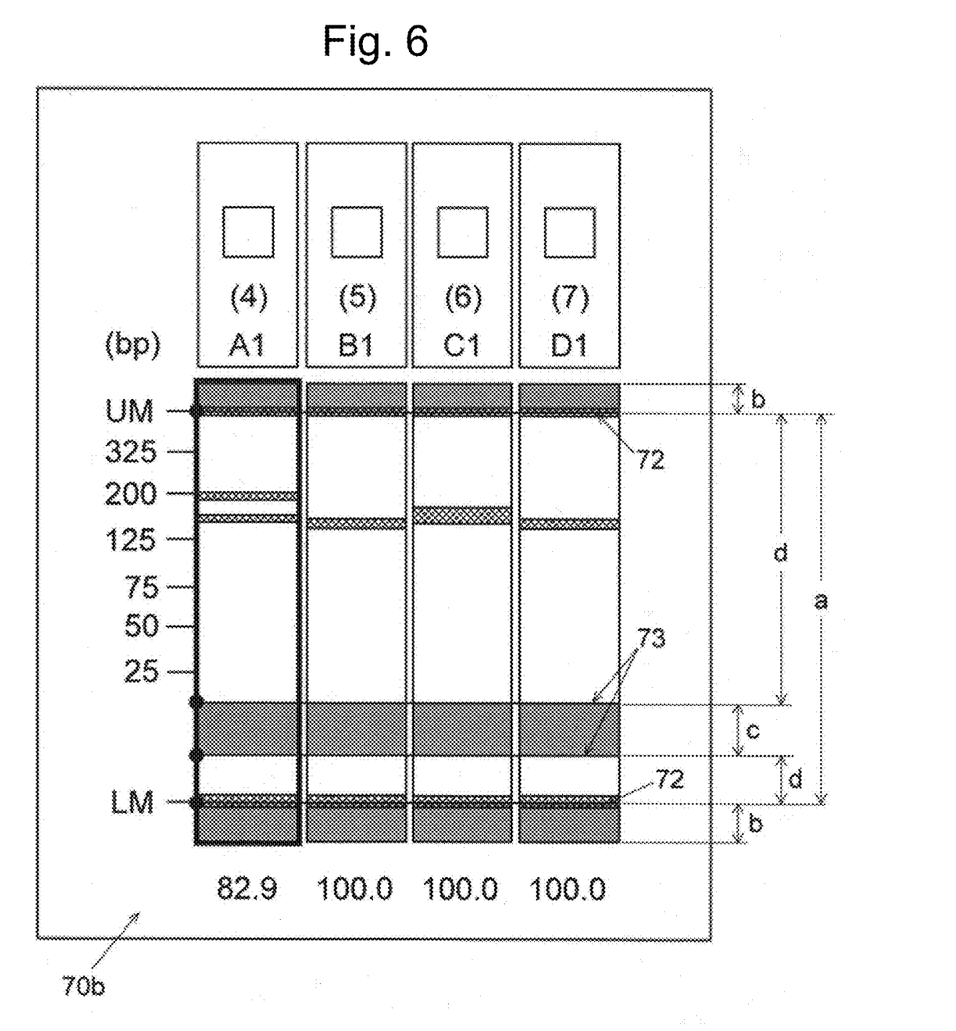
FIG. 6 is a diagram showing one example of the display of a separation image in the molar concentration ratio analysis screen (with the analysis target range and other kinds of ranges specified).

As shown in FIG. 6, the analysis condition setting processor 34 also superposes the following lines on the separation image 70b via the display processor 37: two analysis range indication lines 72 corresponding to the upper and lower limits specified in the analysis range designation data grid 101, and two exclusion range indication lines 73 corresponding to one pair of the upper and lower limits specified in the exclusion range designation data grid 102. Unlike the electropherogram, the focused-on range indication lines are not shown on the separation image 70b. This is due to the fact that the length of the separation image in the size-axis direction is considerably shorter than that of the electropherogram, so that it is normally difficult to clearly display the narrow focused-on ranges on the separation image. Understandably, the focused-on range indication lines may also be superposed on the separation image 70b.

The analysis condition setting processor 34 shows, via the display processor 37, the out-of-analysis range areas "b" and the exclusion range "c", i.e., the areas on the outside of the analysis target ranges "d", by an overlay display with the same color as the background color of those ranges on the electropherogram (in the present case, dark blue). Thus, the separation image 70b also allows the user to clearly distinguish between the analysis target ranges "d" and the other ranges (out-of-analysis range areas "b" and exclusion range "c") by sight.

After the analysis target ranges and the focused-on ranges have been determined in the previously described manner, the analysis target peak determiner 35 locates analysis target peaks present within the analysis target range as well as a focused-on peak present within each focused-on range. For example, the peak information collected in the previously described manner is used to locate, as an analysis target peak, each peak whose peak top is within a range of sizes corresponding to the analysis target range. It is naturally possible to apply a stricter criterion which requires that a peak should be identified as an analysis target peak if it entirely falls within the analysis target range, from the beginning position to the ending position of the peak.

After the analysis target peaks and the focused-on peaks have been determined, the data-analysis processor 36 performs calculations based on the area values of those peaks included in the peak information to determine the molar concentration of each DNA fragment corresponding to each peak, the ratio of the molar concentration corresponding to each focused-on peak to the total of the molar concentrations corresponding to all analysis target peaks (molar concentration/total molar concentration), as well as the ratio of the molar concentration corresponding to all focused-on peaks to the total of the molar concentrations corresponding to all analysis target peaks (total focused-on fragment molar concentration/total molar concentration). Other appropriate kinds of numerical values can also be calculated from the peak information, such as an average size, size distribution and size ratios of all analysis target peaks. The display processor 37 displays the various numerical values calculated by the data-analysis processor 36 in an analysis result table 90 shown in the analysis result display area 6D.

It should be noted that the numerical values entered in the analysis condition setting dialog 100 by the operator are not exact values for which the actual positions of the peaks and other relevant factors are taken into account. Therefore, the analysis target ranges and the focused-on ranges initially displayed on the electropherogram 80b and the separation image 70b do not correctly cover the ranges which the operator actually intends to analyze. Accordingly, the operator appropriately adjusts the positions and sizes of the analysis target ranges "d" and the focused-on ranges "e" and "f" by graphical operations on the displayed electropherogram 80b or the separation image 70b.

Figure 8:
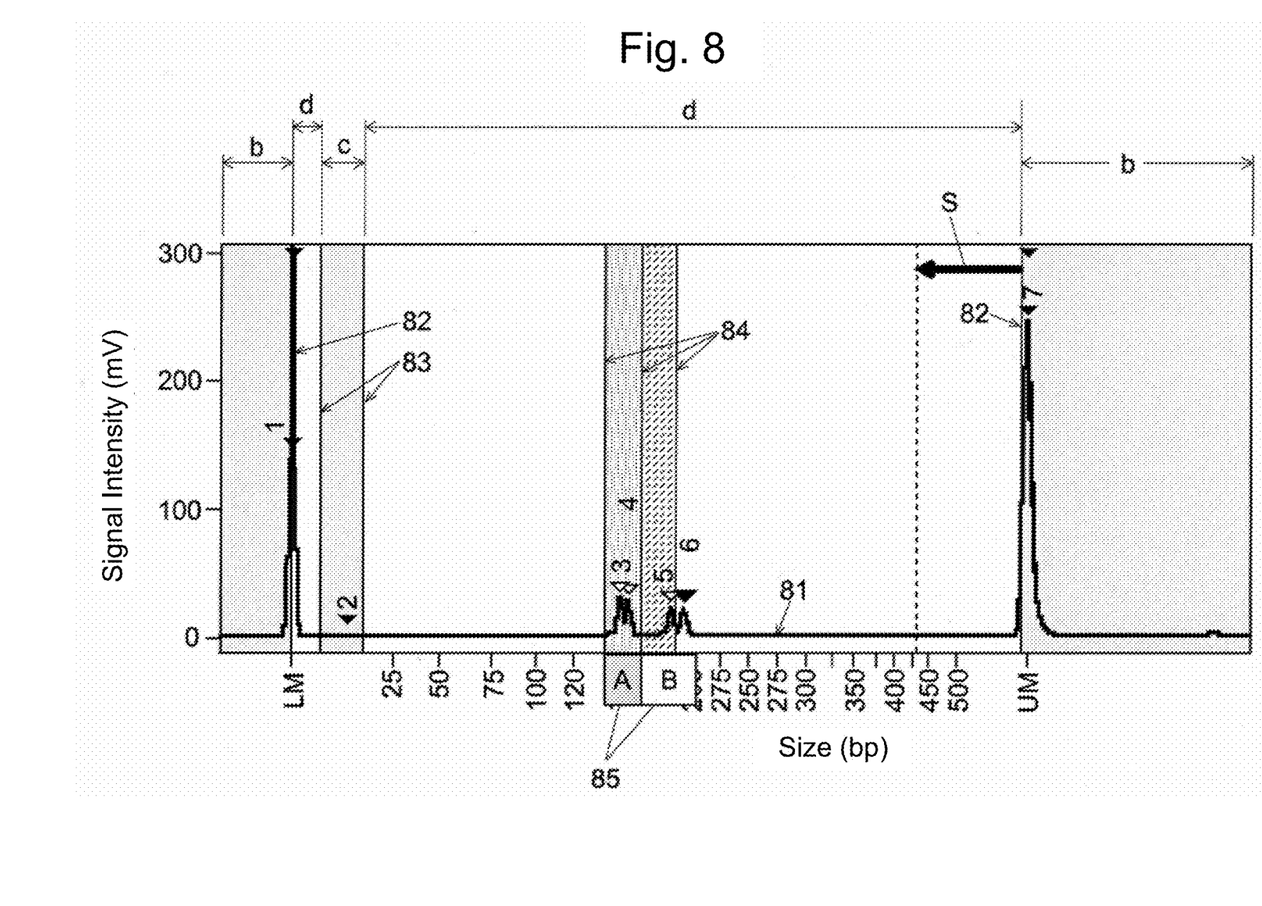
FIG. 8 is a diagram illustrating the display state in the process of changing the analysis target range on an electropherogram.

That is to say, the operator using the operation unit 4 selects an analysis range indication line 82 on the electropherogram 80b by a click operation (or the like) and drags the same line 82 to a desired position, as shown by arrow S in FIG. 8. Each of the exclusion range indication lines 83 and the focused-on range indication lines 84 can also be moved by a similar operation. While any one of those lines is being dragged, the analysis condition setting processor 34 via the display processor 37 causes the display colors of the areas bounded by the line to be paler. In other words, it increases the transparency of the colored areas shown by an overlay display. For example, while an analysis range indication line 82 is being moved as shown in FIG. 8, the color of the out-of-analysis range areas "b" is made to be paler (in the present case, the dark blue is changed to pale blue).

As shown in FIG. 4, since the colored areas indicating the portions outside the analysis target ranges have a comparatively dark color, the migration waveform 81 underneath those areas is poorly visible. This is due to the fact that the portions of the migration waveform on the outside of the analysis target ranges "d" are excluded from the analysis in the first place. On the other hand, when the operator is dragging an analysis range indication line 82 or exclusion range indication line 83, the color of the areas on the outside of the analysis target ranges "d" becomes paler, as shown in FIG. 8. This increases the visibility of the migration waveform 81 lying underneath, so that the operator can easily move the analysis range indication line 82 or exclusion range indication line 83 to an intended position. In this manner, the analysis target ranges "d" as well as the focused-on ranges "e" and "f" can be conveniently adjusted by a graphical operation.

In response to the previously described operations, the analysis condition setting processor 34 renews the size value corresponding to each of the lines 82, 83 and 84 according to the destination position of the line concerned. Along with the change in the position of each of the lines 82, 83 and 84, the analysis condition setting processor 34 changes the range of each overlay-displayed colored area related to the line concerned. After the moving operation on the line concerned has been completed, the analysis condition setting processor 34 restores the temporarily paled areas to their original color.

On the electropherogram 80b, a focused-on range indication tag 85, which is an alphabetical code for identifying each focused-on range (in FIGS. 4 and 8, "A" or "B"), is attached to the lower end of the focused-on range indication line 84 on the left side of each focused-on range. When this focused-on range indication tag 85 is clicked by the operator, the analysis condition setting processor 34 activates the focused-on range linked with that focused-on range indication tag 85. In this state, the focused-on range indication tag 85 can be horizontally moved by a drag operation. In response to this operation, the analysis condition setting processor 34 horizontally moves the entire focused-on range which is active, without changing its width. By this operation, the operator can change the position of each focused-on range while maintaining the width of the same range.

As described thus far, the position and width of each of the analysis target ranges "d" and the focused-on ranges "e" and "f" can be freely adjusted on the electropherogram 80b by moving each of the analysis range indication lines 82 or other related lines by a drag operation, or by moving the focused-on range indication tag 85 by a drag operation. Each line and the colored areas determined by this line on the electropherogram 80b are interlocked with the corresponding line and the colored areas determined by this line on the separation image 70b, and vice versa. Therefore, when any of the previously described operations has been performed on the electropherogram 80b, the analysis condition setting processor 34 immediately applies the effect of this operation to the separation image 70b. Similarly, for example, when one of the analysis range indication lines 72 on the separation image 70b has been moved by a drag operation, the analysis condition setting processor 34 immediately applies the effect of this operation to the electropherogram 80b.

When, for example, an analysis range indication line 72 on the separation image 70b is being dragged, the analysis condition setting processor 34 similarly causes the color of the colored areas representing the outside of the analysis target ranges to be paler. Accordingly, when moving an analysis range indication line 72 or exclusion range indication line 73, the operator can easily recognize the positions of the peaks on the separation image 70b by sight.

The effect of a change of an analysis range (or the like) produced by a graphical operation on the electropherogram 80b or separation image 70b in the previously described manner is immediately applied to the numerical values in the analysis condition setting dialog 100. That is to say, the electropherogram 80b, separation image 70b and analysis condition setting dialog 100 are interlocked with each other, thereby allowing the operator to specify or change the analysis ranges, exclusion ranges and focused-on ranges from any of them, and to recognize the latest state at that point in time.

When any one of the analysis target ranges "d" or the focused-on ranges "e" and "f" has been changed by an operation by the operator, the analysis target peak determiner 35 once more locates the analysis target peaks and the focused-on peaks for the new ranges as needed. The data-analysis processor 36 subsequently performs recalculations based on the updated peak information. The display processor 37 renews the display according to the recalculated result.

For example, when an operation for moving an analysis range indication line 82 on the electropherogram 80b is performed by the operator, the numerical values in the analysis result table 90 (e.g., molar concentration ratios) are almost immediately renewed by the latest values, following the operation. Thus, while changing an analysis target range (or the like) on the electropherogram 80b or separation image 70b by a graphical operation, the operator can immediately check analysis results corresponding to the analysis target ranges and the fucus ranges in the middle of the changing process.

In the previous descriptions, the analysis range indication lines (and the likes) are displayed on the electropherogram and the separation image for the first time when numerical values have been entered in the analysis condition setting dialog 100. The system may be configured so that the analysis range indication lines (and the likes) is also displayed by a predetermined operation on the electropherogram or the separation image. For example, the focused-on ranges may be appropriately added on the electropherogram 80b along with those specified in the analysis condition setting dialog 100. More specifically, the system may be configured so that a predetermined operation (e.g., double click) near a peak detected in the migration waveform 81 adds a new pair of focused-on range indication lines 84 including that peak as well as a new focused-on range sandwiched between those lines 84. This configuration allows the operator to set analysis target ranges and focused-on ranges without performing an operation for opening the analysis condition setting dialog 100.

In the examples of FIGS. 2 and 4, only one migration waveform corresponding to a single sample is displayed in the electropherogram display area 6C. It is also possible to display, in the electropherogram display area 6C, a plurality of migration waveforms which respectively correspond to the same number of samples. In that case, those migration waveforms may be drawn superposed on each other in a single electropherogram having a common vertical axis, or they may be arranged in a vertically stacked form with their horizontal scales coinciding with each other.

In the electrophoretic analyzer system according to the previous embodiment, the focused-on ranges are specified in order to determine the molar concentration ratio between the analysis target peaks and the focused-on peaks. The system may also be configured so that only the exclusion ranges, or the analysis ranges and the exclusion rages, are specified, without the focused-on ranges. For example, when the total area value of all peaks and a concentration value determined from that total area value must be calculated from an electropherogram in which a considerable number of noise peaks are observed, the noise peaks can be specified as the exclusion ranges so as to exclude those noise peaks from the calculation.

In the electrophoretic analyzer system according to the previous embodiment, both the separation image and the electropherogram are displayed, and the analysis ranges (and other ranges) can be specified on any of those graphs by a graphical operation. A system configured to display only the separation image or the electropherogram is also possible.

It should be noted that the previous embodiment is a mere example of the present invention, and any change, modification, addition or the like appropriately made within the gist of the present invention will naturally fall within the scope of claims of the present application.

[Various Modes]

A person skilled in the art can understand that the previously described illustrative embodiment is a specific example of the following modes of the present invention.

(Clause 1) One mode of the electrophoretic analysis data processing device according to the present invention is a data processing device for processing data acquired by an electrophoretic analysis, including:

a graph creator configured to create an electropherogram and/or a separation image of peaks on an electrophoretic channel, based on acquired data;

a display processor configured to display, on a display section, a graph showing the electropherogram and/or the separation image on which a boundary line is drawn to define the inside and the outside of an analysis target range extending along the axis of a separation direction, with the inside and the outside being shown in different visual modes;

an analysis condition setter configured to receive an operation by a user for moving the boundary line on the graph displayed, and to set the analysis target range whose position and size on the axis are changed according to the received operation; and a data-analysis processor configured to carry out a predetermined computation using all or some of the peaks included in the analysis target range.

(Clause 6) One mode of the electrophoretic analysis data processing program according to the present invention is a data processing program for using a computer to process data acquired by an electrophoretic analysis, the program configured to cause a computer to perform:

a graph creation step for creating an electropherogram and/or a separation image of peaks on an electrophoretic channel, based on acquired data;

a display processing step for displaying, on a display section, a graph showing the electropherogram and/or the separation image on which a boundary line is drawn to define the inside and the outside of an analysis target range extending along the axis of a separation direction, with the inside and the outside being shown in different visual modes;

an analysis condition setting step for receiving an operation by a user for moving the boundary line on the graph displayed, and for setting the analysis target range whose position and size on the axis are changed according to the received operation; and a data-analyzing step configured to carry out a predetermined computation using all or some of the peaks included in the analysis target range.

In the device according to Clause 1 and the program according to Clause 6, an analysis target range for calculating the molar concentration (or the like) of a target component, such as a DNA fragment, can be specified by a simple, intuitively understandable operation on an electropherogram or separation image. In particular, since the inside and the outside of the analysis target range can be clearly distinguished from each other by their difference in display mode, such as the color of the area on the electropherogram or separation image, the operator can efficiently and correctly understand whether or not a peak which the operator's attention is focused on is certainly included within the analysis target range, or conversely, whether or not a peak originating from a non-target component is certainly excluded from the analysis target range.

Thus, the device according to Clause 1 and the program according to Clause 6 can improve the ease of operation for a molar concentration ratio analysis or other various kinds of analyses which use data collected by an electrophoretic analysis. The working efficiency of the data analysis is thereby improved, and user's errors in the task are reduced.

(Clause 2) In the electrophoretic analysis data processing device according to Clause 1, the display processor may show an area on the outside of the analysis target range by an overlay display with a predetermined color different from the color of an area on the inside of the analysis target range, and the analysis condition setter may increase the transparency of the overlay display covering the area on the outside of the analysis target range while the operation by a user for moving the boundary line is being performed.

(Clause 7) In the electrophoretic analysis data processing program according to Clause 6, the display processing step may include showing an area on the outside of the analysis target range by an overlay display with a predetermined color different from the color of an area on the inside of the analysis target range, and the analysis condition setting step may include increasing the transparency of the overlay display covering the area on the outside of the analysis target range while the operation by a user for moving the boundary line is being performed.

The device according to Clause 2 and the program according to Clause 7 can cause the color of the overlay display covering the area on the outside of the analysis target range to be paler to increase the transparency of the overlay display. This makes it easier for the user to visually recognize the peaks on a migration waveform or separation image within the area on the outside of the analysis target range, so that the user can more appropriately set the analysis target range.

(Clause 3) In the electrophoretic analysis data processing device according to Clause 1 or 2, the analysis condition setter may be configured to specify, in addition to the analysis target range, one or more focused-on ranges within the analysis target range, and the data-analysis processor may be configured to calculate a concentration ratio based on an area value of each peak included in the analysis target range and an area value of each peak included in each of the one or more focused-on ranges.

(Clause 8) In the electrophoretic analysis data processing program according to Clause 6 or 7, the analysis condition setting step may include specifying, in addition to the analysis target range, one or more focused-on ranges within the analysis target range, and the data-analyzing step may include calculating a concentration ratio based on an area value of each peak included in the analysis target range and an area value of each peak included in each of the one or more focused-on ranges.

The "concentration ratio" in the present context includes the molar concentration ratio and the mass concentration ratio. The device according to Clause 3 and the program according to Clause 8 can obtain a desired kind of concentration ratio with a high level of accuracy, based on a focused-on peak (or peaks) and an analysis target peak (or peaks) appropriately set by the user.

(Clause 4) In the electrophoretic analysis data processing device according to one of Clauses 1-3, the display processor may be configured to display both the electropherogram and the separation image on an identical screen, and the analysis condition setter may be configured to change the position of the boundary line superposed on the electropherogram and the position of the boundary line superposed on the separation image, in such a manner that the boundary lines are interlocked with each other.

(Clause 9) In the electrophoretic analysis data processing program according to one of Clauses 6-8, the display processing step may include displaying both the electropherogram and the separation image on an identical screen, and the analysis condition setting step may include changing the position of the boundary line superposed on the electropherogram and the position of the boundary line superposed on the separation image, in such a manner that the boundary lines are interlocked with each other.

The device according to Clause 4 and the program according to Clause 9 allows the user to use both the electropherogram and the separation image to check whether or not the analysis target range and the focused-on range are appropriately set. The user can set the analysis target range and the focused-on range by a graphical operation using either the electropherogram or the separation image, whichever provides a clearer view of the observed target component (or the like).

(Clause 5) In the electrophoretic analysis data processing device according to Clause 4, the analysis condition setter may be configured to display a dialog for an input of a numerical value of information indicating the position of the analysis target range, and to change the numerical value in the dialog, the position of the boundary line superposed on the electropherogram, and the position of the boundary line superposed on the separation image, in such a manner that the numerical value and the boundary lines are interlocked with each other.

(Clause 10) In the electrophoretic analysis data processing program according to Clause 9, the analysis condition setting step may include displaying a dialog for an input of a numerical value of information indicating the position of the analysis target range, and changing the numerical value in the dialog, the position of the boundary line superposed on the electropherogram, and the position of the boundary line superposed on the separation image, in such a manner that the numerical value and the boundary lines are interlocked with each other.

In the device according to Clause 5 and the program according to Clause 10, when the analysis target range or a focused-on range has been specified or changed by a graphical operation on the electropherogram or separation image, the state of the specified or changed range can be immediately checked in the numerical form. This helps reducing errors in the task, such as input errors or operation errors, and the user can properly set the ranges and obtain an intended analysis result.

REFERENCE SIGNS LIST

1 . . . Measurement Unit
10 . . . Sample Supplier
11 . . . Electrophoretic Separator
12 . . . Detector
13 . . . Analogue-to-Digital Converter
2 . . . Control Unit
3 . . . Data Processing Unit
30 . . . Data Storage Section
31 . . . Electropherogram Creator
32 . . . Peak Detector
33 . . . Separation Image Creator
34 . . . Analysis Condition Setting Processor
35 . . . Analysis Target Peak Determiner
36 . . . Analysis Processor
37 . . . Display Processor
4 . . . Operation Unit
5 . . . Display Unit
6 . . . Molar Concentration Ratio Analysis Screen
6A . . . Sample Display Area
6B . . . Separation Image Display Area
6C . . . Electropherogram Display Area
6D . . . Analysis Result Display Area
60 . . . Well Image
70, 70a, 70b . . . Separation Image
72 . . . Analysis Range Indication Line
73 . . . Exclusion Range Indication Line
80, 80a, 80b . . . Electropherogram
81 . . . Migration Waveform
82 . . . Analysis Range Indication Line
83 . . . Exclusion Range Indication Line
84 . . . Focused-on Range Indication Line
85 . . . Focused-on Range Indication Tag
90 . . . Analysis Result Table
a . . . Analysis Range
b . . . Out-of-Analysis Range Area
c . . . Exclusion Range
d . . . Analysis Target Range
e, f . . . Focused-on Range
100 . . . Analysis Condition Setting Dialog
101 . . . Analysis Range Designation Data Grid
102 . . . Exclusion Range Designation Data Grid
103 . . . Focused-on Fragment Designation Data Grid

The invention claimed is:

1. An electrophoretic analysis data processing device for processing data acquired by an electrophoretic analysis, comprising:
a graph creator configured to create an electropherogram and/or a separation image of peaks on an electrophoretic channel, based on acquired data;

a display processor configured to display, on a display section, a graph showing the electropherogram and/or the separation image on which a boundary line is drawn to define an inside and an outside of an analysis target range extending along an axis of a separation direction, with the inside and the outside being shown in different visual modes;

an analysis condition setter configured to receive an operation by a user for moving the boundary line on the graph displayed, and to set the analysis target range whose position and size on the axis are changed according to the received operation; and a data-analysis processor configured to carry out a predetermined computation using all or some of peaks included in the analysis target range.

2. The electrophoretic analysis data processing device according to claim 1, wherein:

the display processor shows an area on the outside of the analysis target range by an overlay display with a predetermined color different from a color of an area on the inside of the analysis target range; and the analysis condition setter increases a transparency of the overlay display covering the area on the outside of the analysis target range while the operation by a user for moving the boundary line is being performed compared to a color of the area on the outside of the analysis target range while the operation by the user for moving the boundary line is not being performed.

3. The electrophoretic analysis data processing device according to claim 1, wherein:

the analysis condition setter is further configured to specify, in addition to the analysis target range, one or more focused-on ranges within the analysis target range; and the data-analysis processor is further configured to calculate a concentration ratio based on an area value of each peak included in the analysis target range and an area value of each peak included in each of the one or more focused-on ranges.

4. The electrophoretic analysis data processing device according to claim 1, wherein:

the display processor is further configured to display both the electropherogram and the separation image on an identical screen; and the analysis condition setter is further configured to change a position of the boundary line superposed on the electropherogram and a position of the boundary line superposed on the separation image, in such a manner that the boundary lines are interlocked with each other.

5. The electrophoretic analysis data processing device according to claim 4, wherein:

the analysis condition setter is further configured to display a dialog for an input of a numerical value of information indicating the position of the analysis target range, and to change the numerical value in the dialog, the position of the boundary line superposed on the electropherogram, and the position of the boundary line superposed on the separation image, in such a manner that the numerical value and the boundary lines are interlocked with each other.

6. A non-transitory computer-readable record medium holding an electrophoretic analysis data processing program for using a computer to process data acquired by an electrophoretic analysis, the program configured to cause a computer to perform:

a graph creation step for creating an electropherogram and/or a separation image of peaks on an electrophoretic channel, based on acquired data;

a display processing step for displaying, on a display section, a graph showing the electropherogram and/or the separation image on which a boundary line is drawn to define an inside and an outside of an analysis target range extending along an axis of a separation direction, with the inside and the outside being shown in different visual modes;

an analysis condition setting step for receiving an operation by a user for moving the boundary line on the graph displayed, and for setting the analysis target range whose position and size on the axis are changed according to the received operation; and a data-analyzing step configured to carry out a predetermined computation using all or some of peaks included in the analysis target range.

7. The non-transitory computer-readable record medium holding an electrophoretic analysis data processing program according to claim 6, wherein:

the display processing step includes showing an area on the outside of the analysis target range by an overlay display with a predetermined color different from a color of an area on the inside of the analysis target range; and the analysis condition setting step includes increasing a transparency of the overlay display covering the area on the outside of the analysis target range while the operation by a user for moving the boundary line is being performed compared to a color of the area on the outside of the analysis target range while the operation by the user for moving the boundary line is not being performed.

8. The non-transitory computer-readable record medium holding an electrophoretic analysis data processing program according to claim 6, wherein:

the analysis condition setting step includes specifying, in addition to the analysis target range, one or more focused-on ranges within the analysis target range; and the data-analyzing step includes calculating a concentration ratio based on an area value of each peak included in the analysis target range and an area value of each peak included in each of the one or more focused-on ranges.

9. The non-transitory computer-readable record medium holding an electrophoretic analysis data processing program according to claim 6, wherein:

the display processing step includes displaying both the electropherogram and the separation image on an identical screen; and the analysis condition setting step includes changing a position of the boundary line superposed on the electropherogram and a position of the boundary line superposed on the separation image, in such a manner that the boundary lines are interlocked with each other.

10. The non-transitory computer-readable record medium holding an electrophoretic analysis data processing program according to claim 9, wherein:

the analysis condition setting step includes displaying a dialog for an input of a numerical value of information indicating the position of the analysis target range, and changing the numerical value in the dialog, the position of the boundary line superposed on the electropherogram, and the position of the boundary line superposed on the separation image, in such a manner that the numerical value and the boundary lines are interlocked with each other.

\* \* \* \* \*